Aug. 17, 1943.  W. O. SELL  2,327,222
AIDING DEVICE FOR BLIND PERSONS
Filed March 27, 1941
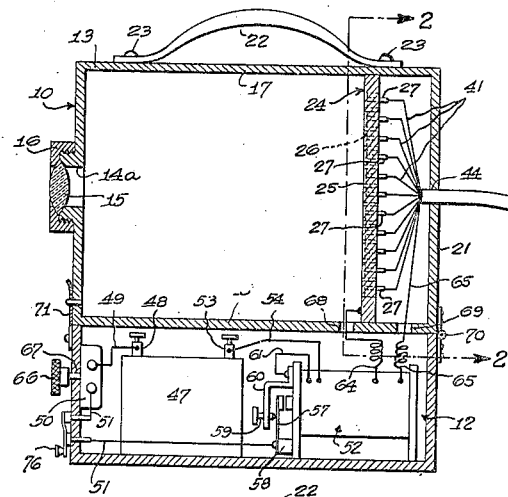
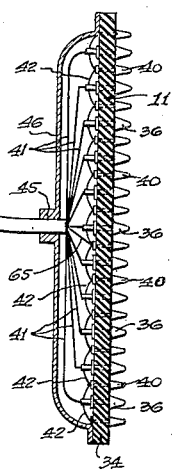
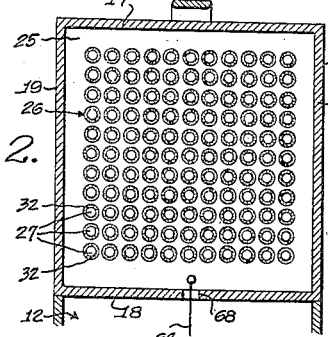
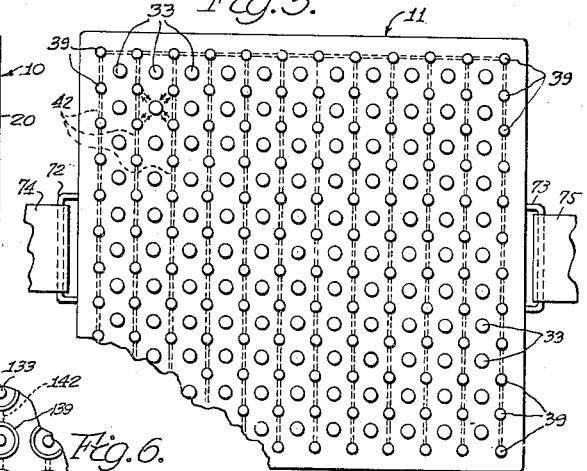
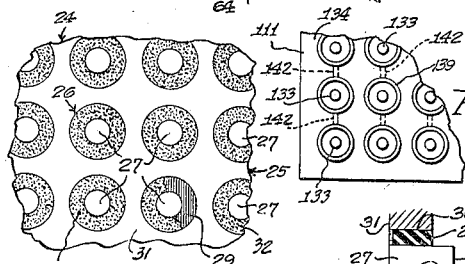
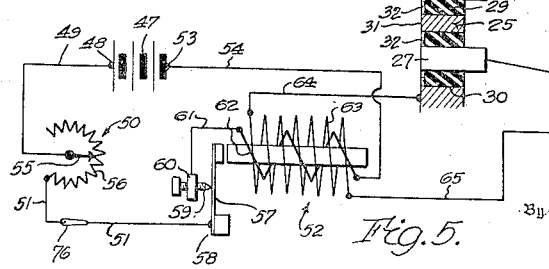
Inventor
William O. Sell,
Attorneys Patented Aug. 17, 1943

2,327,222

UNITED STATES PATENT OFFICE 2,327,222

AIDING DEVICE FOR BLIND PERSONS

William O. Sell, Detroit, Mich.

Application March 27, 1941, Serial No. 385,520

10 Claims. (Cl. 35—1)

This invention relates to devices for aiding the blind and in particular to such devices which simulate vision by a corresponding appeal to one of the other senses.

One object of this invention is to provide a device adapted to produce an impression upon the nerves of an area of the body corresponding to an image received by the device.

Another object is to provide means for producing an optical image of the scene in front of the blind person and converting it into a multiple electrical stimulation of a skin area on the body of the blind person corresponding to and changing with the nature of the scene.

Another object is to provide a device for aiding blind persons wherein an optical image of the scene in front of the blind person is focused upon a screen containing multiple photo-electric cells connected to corresponding multiple spaced electrodes upon a body plate in circuit with a source of electricity of sufficient potential, so that the optical image pattern upon the screen is translated into an electrical stimulation pattern upon the portion of the skin of the person to which the body plate is applied.

Another object is to provide a camera obscura focusing an image upon a screen containing multiple photo-electric cells connected to corresponding multiple electrodes upon a body plate and in circuit with a source of relatively high electrical potential so that changes in the nature of the image are immediately converted into changes in the stimulation created by the multiple electrodes upon the nerves in the skin of the blind person.

Another object is to provide a device as set forth in the preceding objects wherein the multiple electrodes are surrounded by baffles for preventing the short-circuiting of the body plate by perspiration.

In the drawing:

Figure 1 is a vertical section through the device of this invention.

Figure 2 is a cross section along the line 2—2 in Figure 1, showing the screen with the multiple photo-electric cells.

Figure 3 is a front elevation of the multiple electrode body plate shown in Figure 1.

Figure 4 is an enlarged fragmentary elevation of a portion of the multiple photo-electric cell screen shown in Figure 2.

Figure 5 is a diagrammatic view of a wiring diagram of the electrical circuit for the device shown in Figure 1.

Figure 6 is an enlarged fragmentary view of a portion of a modification of the body plate from that shown in Figure 3.

In general, the device of this invention consists of a camera-like apparatus, usually known as a camera obscura having a lens adapted to focus an optical image upon a screen containing a large number of tiny photo-electric cells. The latter are preferably of the resistance type, such as selenium cells, and are connected in circuit with corresponding multiple electrodes mounted upon an insulated body plate which is clamped against the skin of the blind person. The circuit also contains a source of sufficiently high potential electricity, such as a transformer or spark coil, and a source of low potential electricity such as a battery. A rheostat is inserted in the low tension circuit of the battery to regulate the strength of the sensation. An automatic circuit interrupter is also preferably included in the circuit in order to make and break the circuit. The lens focuses an image of the scene on the multiple photo-electric screen and the individual circuits are completed according to the intensity of the light falling upon the particular photo-electric cell, the latter being preferably of the resistance type, such as selenium cells. Thus, the blind person experiences a series of very mild shocks from the multiple electrodes, these shocks corresponding in intensity with the intensity of the light falling upon the screen. A moving object thus would cast a moving image and a moving stimulation would result on the electrodes of the body plate, thus warning the blind person of the approach of the moving object.

Referring to the drawing in detail, Figure 1 shows the device of the invention as consisting of a camera obscura generally designated 10, a body electrode plate generally designated 11, and an electrical energy casing generally designated 12 and secured to the camera obscurer 10. The latter includes a box-like casing 13 having an aperture 14a in the front wall 14 thereof containing an objective lens 15 held in position by the mounting 16. The lens 15 for simplicity is shown as a single lens whereas in actual practice a multiple-element objective would preferably be used in order to create a sharply defined image which is free from distortion. The casing 13 is also provided with a top 17, a bottom 18, side walls 19 and 20, and a rear wall 21. A casing handle 22 is secured as at 23 to the top wall 17.

Mounted at the principal focus of the objective lens 15 is a multiple photo-electric cell screen generally designated 24 which may be concisely termed a photo-cell screen. The photo-cell screen 24 preferably consists of a plate 25 of conducting material having a plurality of photo-electric cells generally designated 26 mounted close together of substantially the entire screen, or the portion thereof on which the image is cast by the objective lens system 15.

Each photo-electric cell 26 consists of a central electrode 27 mounted in a bore 28 in an insulating plug 29, which in turn is mounted in a bore 30 in the conducting plate 25. The end of the plug 29 is countersunk slightly beneath the front surface 31 of the conducting plate 25, thus forming an annular recess for a photo-electric element 32 such as a selenium element. Selenium possesses the property of varying in electrical resistance according to the amount of light falling upon it, hence transmitting different amounts of electricity through a circuit in which it is included, according to the variation of light falling upon it.

Each of the central poles 27 of the photo-electric cells 26 is connected to a corresponding effective electrode 33 in the body plate 11, the latter having an insulating plate 34 with spaced bores 35 in which the electrodes 33 are arranged. The effective electrodes 33 are provided with tapered contact tips 36 for engagement with the skin 37 of the blind person so that the end of each electrode 33 will engage a relatively small area of the user's body.

The insulating plate 34 of the body plate 11 is also provided with a plurality of spaced bores 38 in which are mounted spaced indifferent electrodes 39 likewise having tapered tips 40 spaced apart from the tapered tips 36 of electrodes 33 and similarly in engagement with the skin of the user. The effective electrodes 33 and indifferent electrodes 39 can be spaced various distances depending upon the sensitivity of the nerves in various portions of the body. The poles 27 and electrodes 33 are connected by the conductors 41 whereas the indifferent electrodes 39 are themselves interconnected by the conductors 42 common to all of the electrodes 39. The conductors 41 are contained in a cable 43 which extends through holes 44 and 45 in the back wall 21 and cover plate 46 of the casing 13 and body plate 11 respectively. The cover member 46 protects the exposed ends of the electrodes at the back of the plate 34.

The electrical circuit containing the photo-electric cells 26 and effective electrodes 33 and indifferent electrodes 39 are energized by devices mounted within the lower casing 12 and containing a battery 47 or other suitable source of electricity having a pole 48 connected by the conductor 49 to a rheostat 50 which in turn is connected by the conductor 51 to a spark coil or transformer 52 (Figure 1). The other pole 53 of the battery 47 is connected by the line 54 to the spark coil 52. In particular, the conductor 49 is connected to the adjusting arm 55 of the rheostat 50, the resistance element 56 of which is connected by the conductor 51 to the vibrating arm 57 of the automatic circuit interrupter 58 which also includes an adjustable contact 59 threaded through a mount 60 which is connected by the conductor 61 to one pole of the primary winding 62 being connected to the conductor 54. One pole of the secondary winding 63 of the spark coil 52 is connected by the conductor 65 to the conductor 42 interconnecting the electrodes 39.

The rheostat 50 is adjusted by a knob 66 projecting through a hole 67 in the front of the lower casing 12 and the secondary leads 64 and 65 of the spark coil 52 pass upwardly through apertures 68 and 69 respectively in the bottom wall 18 of the casing 13. The lower casing 12 is preferably hinged as at 70 to the rear wall 21 of the upper casing 13 and is releasably secured in place by the latch 71 connecting it to the front wall 14 of the casing 13.

The body plate 11 is provided with belt loops 72 and 73 at its opposite edges for the attachment of belt portions 74 and 75. By means of the latter the body plate 11 may be clamped to an area of the skin in any convenient location. The spacing of the electrodes 33 and 39 may be varied to suit the particular portion of the body to which the electrode is applied, and this in turn, naturally depends upon the relative distribution and concentration of the nerve endings in the skin.

The modification shown in Figure 6 shows a body plate 111 including an insulating plate 134 having effective electrodes 133 therein corresponding to the photo-electric cell effective electrodes 33 in the principal form of the invention. Surrounding the electrodes 133 are annular indifferent electrodes 139 corresponding to the indifferent electrodes 39 and similarly interconnected by the conductors 142. The annular electrodes 139 having the advantage of localizing the sensations by entirely surrounding the electrodes 133 so that the current will be confined within the indifferent annular electrodes only and not radially to three or more indifferent electrodes in the form of the invention shown in Figures 1 to 5 inclusive. The annular electrodes 139 also serve somewhat to localize the effect of perspiration, which might otherwise short-circuit the various electrodes. The electrical connections of the electrodes 133 and 139 are the same as those described above for the electrodes 33 and 39, and the operation is similar.

In the operation of the invention, the blind person clamps the body plate 11 against his skin at any suitable location and adjusts the knob 66 of the rheostat 50 until the electrical sensations produced between the electrode tips 36 and 40 are strong enough to be sensitively perceived. When the blind person aims the casing 13 in the direction which he wishes to scan, the lens 15 casts an image of the scene upon the multiple photo-electric cell screen 24. The intensity of light in this image will vary and accordingly the different photo-electric cells 26 will vary in resistance and will accordingly transmit different amounts of electricity. The current flowing through the primary circuit, including the battery 47, will thus be differently discharged through the secondary circuit including the photo-electric cells 26 and electrodes 33 and 39, those photo-cells on which the more intense light falls passing a more powerful electrical discharge to their electrodes. The user therefore experiences a tingling sensation between the various electrodes, and by the varying nature of this tingling sensation, he is enabled to interpret the nature of the scene before him, particularly after he has had sufficient practice with the apparatus. The blind person can interpret the approach or passing of a moving object, such as an automobile, by the changing of the sensation from point to point in the area covered by the body plate 11, assuming that the camera obscura 10 is held stationary at the time.

The rheostat 50 may be of the type which also serves as a switch, or a switch 76, such as a push-button switch, may be inserted in the primary circuit for energizing and de-energizing the apparatus.

While a specific embodiment of the invention has been described and illustrated, it will be understood that various modifications may be made within the scope of the appended claims without departing from the spirit of the invention.

What I claim is:

1. In an aiding device for blind persons, optical means for forming an image, photo-electric means for translating said image into electrical impulses, a dielectric plate providing an electrode support to be positioned adjacent the body, and a plurality of slightly separated electrodes on said support engaging the skin of the person for applying said impulses to the nervous system of the body.

2. In an aiding device for blind persons, optical means for forming an image, photo-electric means for translating said image into electrical impulses, a dielectric plate providing an electrode support to be positioned adjacent the body, and a plurality of slightly separated electrodes mounted on the support and connected to said photo-electric means for applying said impulses to the nerves in the skin of the person.

3. In an aiding device for blind persons, a lens system arranged to form an image, a screen with multiple photo-electric cells arranged to receive and translate said image into multiple electrical impulses, a dielectric plate providing an electrode support to be positioned adjacent the body, and a plurality of slightly separated electrodes carried by said support engageable with the skin of the person for applying said impulses to the nervous system of the body.

4. In an aiding device for blind persons, a lens system arranged to form an image, a screen with multiple photo-electric cells arranged to receive said image, said cells being variable in electrical resistance in response to the falling of light thereon, a dielectric plate providing an electrode support to be positioned adjacent the body, a plurality of slightly separated electrodes for contacting the skin carried by said support connected to said photo-electric cells, and an open electric circuit arranged to pass electricity through said cells and electrodes, when closed as by the skin of the blind person.

5. In an aiding device for blind persons, a lens system arranged to form an image, a screen with a plurality of equidistantly spaced photo-electric cells arranged to receive said image, said cells being variable in electrical resistance in response to the falling of light thereon, a plurality of effective electrodes respectively connected to said photo-electric cells, a series of indifferent electrodes adjacent but spaced apart from said first-mentioned electrodes, means for applying said electrodes to the skin of the blind person, and means for passing electric current through said cells and between said electrodes by way of the skin of the blind person.

6. In an aiding device for blind persons, a lens system arranged to form an image, a screen with a plurality of photo-electric cells arranged to receive said image, said cells being variable in electrical resistance in response to the falling of light thereon, a body plate engageable with the skin of the blind person and having a plurality of effective electrodes respectively connected to said photo-electric cells and a plurality of indifferent electrodes adjacent to but spaced apart from said effective electrodes, and means for passing electric current through said cells and between said electrodes by way of the skin of the blind person.

7. In an aiding device for blind persons, a lens system arranged to form an image, a screen with a plurality of photo-electric cells arranged to receive said image, said cells being variable in electrical resistance in response to the falling of light thereon, a body plate engageable with the skin of the blind person and having effective electrodes respectively connected to said photo-electric cells and independent electrodes adjacent to but spaced apart from said main electrodes, and means including a high tension electric circuit for passing electric current through said cells and between said electrodes by way of the skin of the blind person.

8. In an aiding device for blind persons, a lens system arranged to form an image, a screen with a plurality of photo-electric cells arranged to receive said image, said cells being variable in electrical resistance in response to the falling of light thereon, a body plate engageable with the skin of the blind person and having a plurality of spaced effective electrodes respectively connected to said photo-electric cells and independent electrodes adjacent to but spaced apart from said effective electrodes, an electrical induction coil including a secondary high tension circuit connected to said photo-electric cells and to said electrodes and a primary low tension circuit associated therewith, and means for energizing said low tension circuit.

9. In an aiding device for blind persons, optical means for forming an image, photo-electric means for translating said image into electrical impulses, and means connected to said photo-electric means for applying said impulses to the nerves of the skin of the blind person and including a plurality of effective electrodes and indifferent electrodes spaced apart from said main electrodes.

10. In an aiding device for blind persons, optical means for forming an image, photo-electric means for translating said image into electrical impulses, and means connected to said photo-electric means for applying said impulses to the nerves of the skin of the blind person and including a plurality of spaced effective electrodes and indifferent electrodes spaced apart from said effective electrodes, certain of said indifferent electrodes substantially encircling the effective electrodes adjacent thereto.

WILLIAM O. SELL.